US008164984B2

(12) United States Patent
Chien

(10) Patent No.: US 8,164,984 B2
(45) Date of Patent: Apr. 24, 2012

(54) TIME PIECE WITH LED LIGHT MEANS

(76) Inventor: Tseng-Lu Chien, Taipei Hseng (TW)

( * ) Notice: Subject to any disclaimer, the term of this patent is extended or adjusted under 35 U.S.C. 154(b) by 0 days.

(21) Appl. No.: 12/545,992

(22) Filed: Aug. 24, 2009

(65) Prior Publication Data
US 2010/0097897 A1 Apr. 22, 2010

Related U.S. Application Data

(63) Continuation of application No. 12/292,580, filed on Nov. 21, 2008, which is a continuation of application No. 11/527,631, filed on Sep. 27, 2006, now abandoned.

(51) Int. Cl.
*G04B 19/30* (2006.01)
*G04C 19/00* (2006.01)
*G02F 1/1335* (2006.01)

(52) U.S. Cl. .............. 368/67; 368/84; 368/242; 349/62

(58) Field of Classification Search ............. 368/10, 368/67, 84, 242, 227; 349/62, 63, 64, 65; 362/603, 612, 615, 621
See application file for complete search history.

(56) References Cited

U.S. PATENT DOCUMENTS

| | | | | |
|---|---|---|---|---|
| 3,574,993 A * | 4/1971 | Black | ............................. | 368/67 |
| 4,011,001 A * | 3/1977 | Moriya | ............................. | 349/65 |
| 4,118,111 A * | 10/1978 | Laesser | ............................. | 349/65 |
| 4,626,074 A * | 12/1986 | Crossland et al. | ............. | 349/65 |
| 4,706,173 A * | 11/1987 | Hamada et al. | ............... | 362/341 |
| 5,341,231 A * | 8/1994 | Yamamoto et al. | ............. | 349/63 |
| 5,465,193 A * | 11/1995 | Tracy | ............................. | 362/617 |
| 5,485,354 A * | 1/1996 | Ciupke et al. | ................. | 362/619 |
| 5,581,380 A * | 12/1996 | Bergman | ......................... | 349/63 |
| 5,600,462 A * | 2/1997 | Suzuki et al. | ................. | 349/112 |
| 5,638,339 A * | 6/1997 | DeLoretto et al. | .............. | 368/10 |
| 5,808,713 A * | 9/1998 | Broer et al. | ..................... | 349/98 |
| 5,926,440 A * | 7/1999 | Chien | ............................. | 368/10 |
| 6,151,087 A * | 11/2000 | Prigent | ......................... | 349/65 |
| 6,151,089 A * | 11/2000 | Yang et al. | ..................... | 349/113 |
| 6,158,868 A * | 12/2000 | Chien | ............................. | 362/84 |
| 6,266,108 B1 * | 7/2001 | Bao et al. | ........................ | 349/63 |
| 6,285,420 B1 * | 9/2001 | Mizumo et al. | ................. | 349/65 |
| 6,390,647 B1 * | 5/2002 | Shaefer | ......................... | 362/276 |
| 6,396,552 B1 * | 5/2002 | Brandt et al. | ................... | 349/63 |
| 6,592,234 B2 * | 7/2003 | Epstein et al. | ................ | 362/603 |
| 6,608,657 B2 * | 8/2003 | Hiyama et al. | ................. | 349/62 |
| 6,636,283 B2 * | 10/2003 | Sasagawa et al. | ............... | 349/65 |
| 6,642,976 B2 * | 11/2003 | Umemoto et al. | .............. | 349/65 |
| 6,742,907 B2 * | 6/2004 | Funamoto et al. | ............ | 362/625 |

(Continued)

*Primary Examiner* — Vit Miska
(74) *Attorney, Agent, or Firm* — Bacon & Thomas, PLLC

(57) ABSTRACT

A timepiece with LED lights uses a simple light-medium body with a very rough finish to allow light from LED(s) to pass though input-end(s) of the light-medium body and travel within the body and obtain a very even brightness on all surfaces of the light medium that are seen by a viewer. Combined with a milky/frosted front sheet overlay, the light-medium surface can get perfect area illumination effects. The movement for the time display can include analog indicators with a guilt-in light-medium on the top cover to achieve a super slim LED illumination for the time piece. For night light application, the sealed-unit may consist of prong-means and an LED related circuit sealed within a safety standard plastic material and assembled with the night light body to save a lot of cost enable use of all kinds of materials. The invention may also be adapted to an LCD display timepiece.

2 Claims, 6 Drawing Sheets

U.S. PATENT DOCUMENTS

| | | | |
|---|---|---|---|
| 6,795,136 B2 * | 9/2004 | Umemoto et al. | 349/61 |
| 6,825,895 B2 * | 11/2004 | Nakano et al. | 349/63 |
| 6,926,426 B2 * | 8/2005 | Currie et al. | 362/282 |
| 6,930,735 B2 * | 8/2005 | Ohkawa et al. | 349/61 |
| 6,987,710 B2 * | 1/2006 | Kibiloski et al. | 368/67 |
| 7,025,473 B2 * | 4/2006 | Dokoupil | 362/640 |
| 7,139,053 B2 * | 11/2006 | Yuuki et al. | 349/114 |
| 7,171,105 B2 * | 1/2007 | Winkler | 385/146 |
| 7,186,016 B2 * | 3/2007 | Jao | 362/644 |
| 2003/0174586 A1 * | 9/2003 | Hon et al. | 368/84 |
| 2005/0018426 A1 * | 1/2005 | Dickie | 362/287 |

* cited by examiner

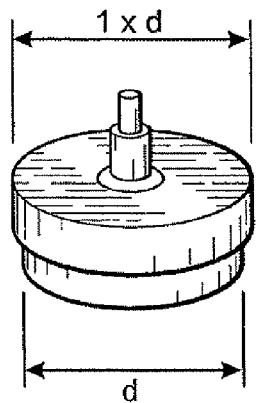
FIG. 7A
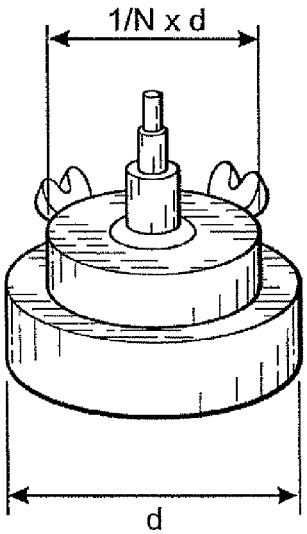
FIG. 7B
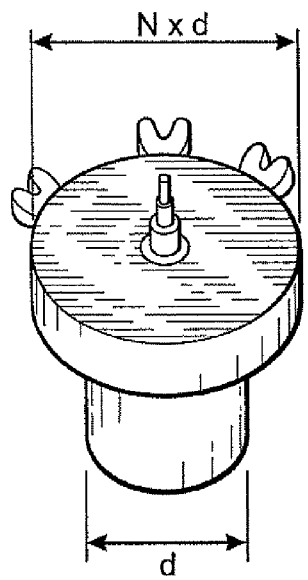
FIG. 7C
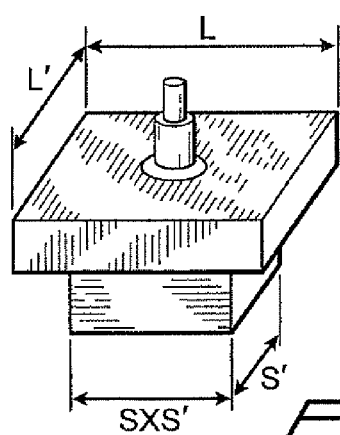
FIG. 7-D
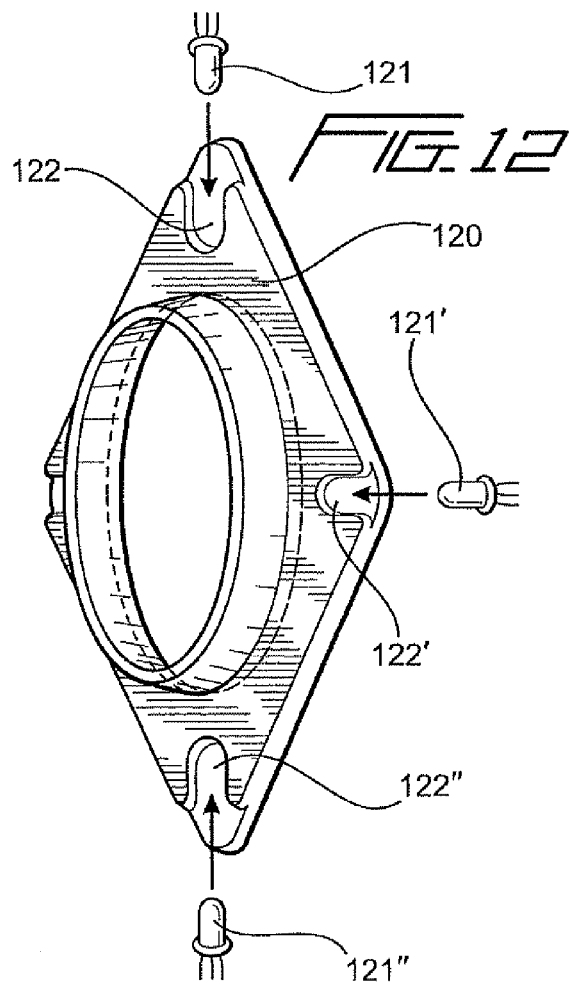
FIG. 12

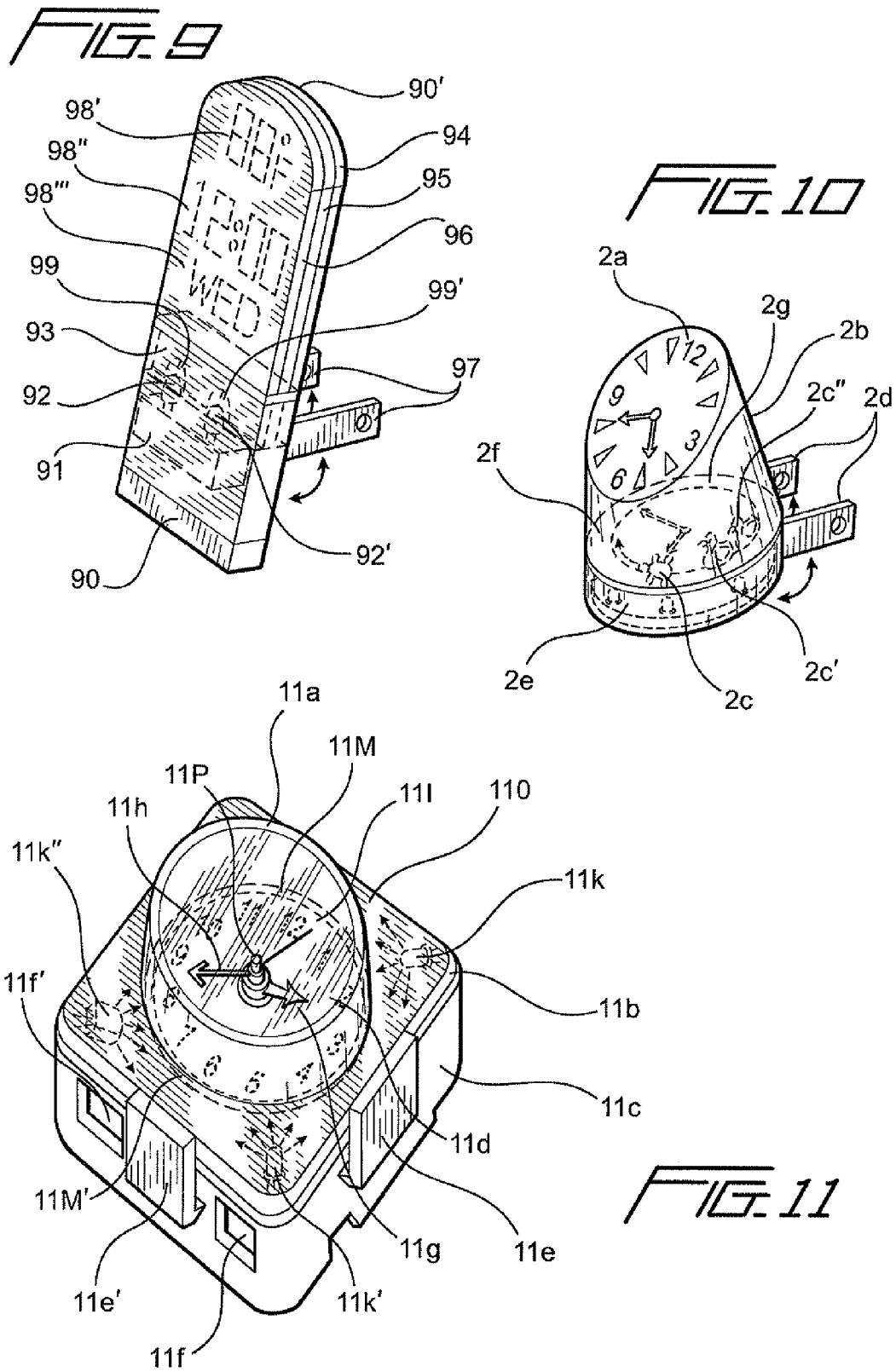

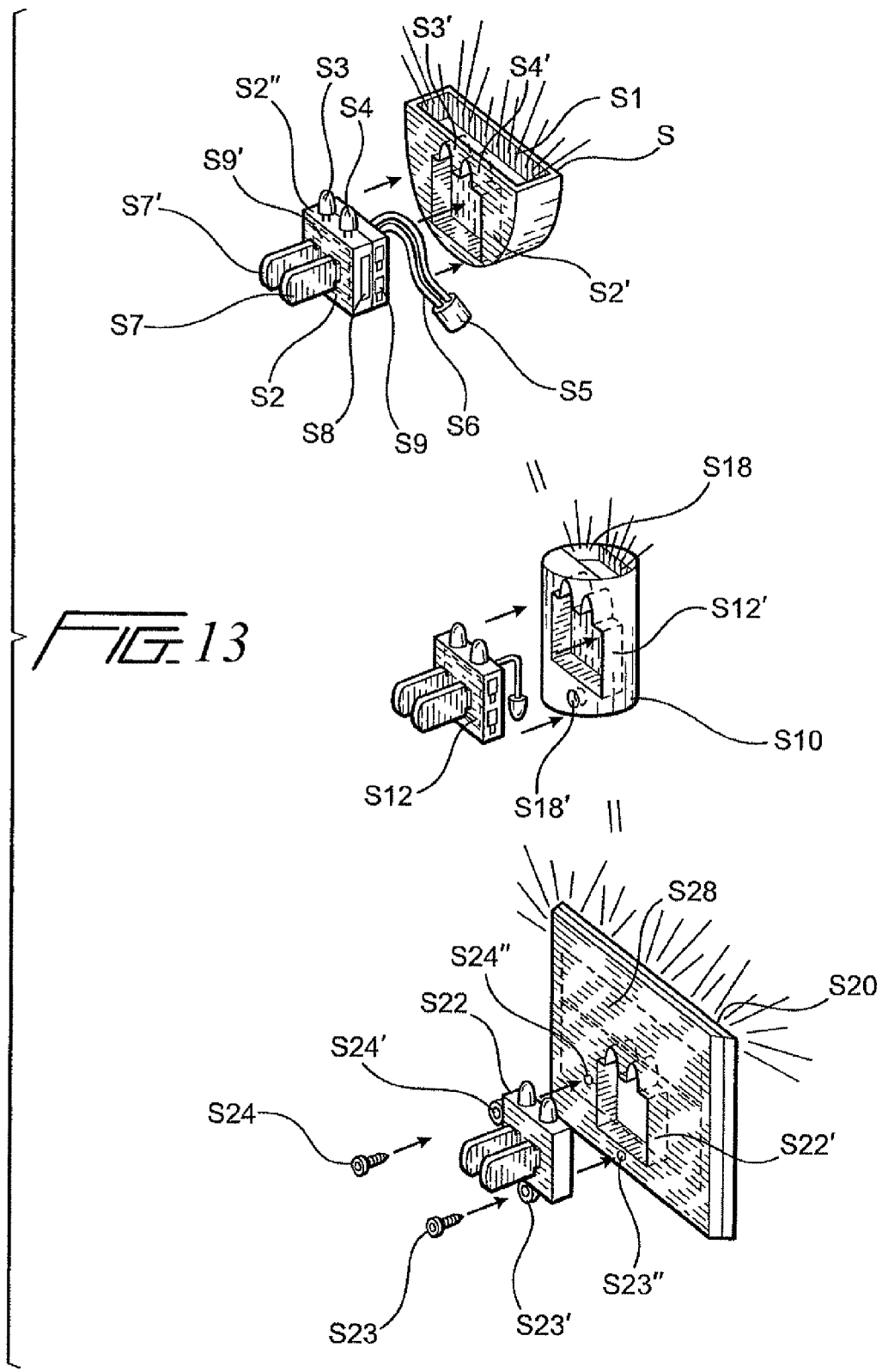

TIME PIECE WITH LED LIGHT MEANS

This application is a continuation of nonprovisional application Ser. No. 12/292,580, filed Nov. 21, 2008, which is a continuation of application Ser. No. 11/527,631, filed Sep. 27, 2006 now abandoned.

BACKGROUND OF THE INVENTION

The subject matter of this application is related to the subject matter of U.S. patent application Ser. Nos. 10/954,189; 11/094,155; 11/094,156; 10/667,787; 10/286,871; 10/621,513; 11/094,215; and 11/255,981.

The inventor's prior art U.S. Pat. No. 5,926,440, U.S. Pat. No. 6,158,868, U.S. Pat. No. 6,170,958, U.S. Pat. No. 6,171,117, U.S. Pat. No. 6,280,053 disclose multiple function night lights including arrangements for incorporating conductive means and a time piece. Another prior art, U.S. Pat. No. 7,054,233, discloses a light emitting diode (hereafter as LED) module that offers a lighting effect for a wall clock, While U.S. Pat. No. 6,987,710 by the same inventor as U.S. Pat. No. 7,054,233 discloses an illumination module back surface having reflective properties to allow light beams to reflect toward the interior of the module and out from the front surface (see, the Abstract, line 7 to line 9, and the detailed description stating that "The back side of reflectors 38, 48 or 78 could alternatively be engraved to provide multiple raised surfaces, such as points, bumps, protuberances, or the like. FIGS. 14 and 15 illustrate surfaces 86 and 87, respectively, created by dot engraving techniques"). Such an illumination module is very expensive to make compared with the current invention. The current invention uses light medium having a rough surface surrounding the medium to cause all light beams to travel within the light medium. This rough-surface treatment has more diffusion effects than the prior structures having a reflective optics property. Furthermore, the prior art seeks to control light beams only "out of the front surface," which is mission impossible. The current invention allows light to be emitted out to the viewer in all directions through the rough-surface of the light medium with the option of having some light beams blocked out by the housing so as to obtain desired light effects. The above-cited patents do not teach a milky/frosted front sheet to enable an illumination module to obtain the best light output. It is impossible to make a commercial items without this milky/frosted front sheet on top of the illumination module.

The inventor also has other prior U.S. patents, including U.S. Pat. No. 6,811,278, U.S. Pat. No. 6,601,964, U.S. Pat. No. 5,926,440, U.S. Pat. No. 6,158,868 directed to electro-luminescent lighting arrangements.

A first feature of the current invention involves a variety of arrangements of the light medium, including the light-medium being located between the front lens and timepiece movement, which optionally may incorporate a cosmetic dial face means or dial marking directly applied to the light-medium surface by silkscreen or a sticker using conventional market available skills. Alternatively, the light medium can be located on a part of the timepiece movement, such as a top cover of the movement, to provide a relatively slim device.

A second feature of the current invention involves adapting a very simple optic theory to the light medium for time piece illumination, which is similar to the optic theory used in notebook computer screens, which is in contrast to the "back surface with reflective property" arrangements illustrated in FIGS. 14 and 15 (86) and (87), of the above-cited U.S. Pat. No. 7,054,233, which require a complicated optics lens. The current invention light medium simply uses a rough surface of the light medium to obtain a very even illumination on the whole unit surface.

The third feature of the current invention is to incorporate the rough-treatment light medium with a front milky or frosted sheet to provide perfect illuminating effect with super low cost while meeting all safety standards.

The fourth feature of the current invention incorporation of prong-means with an LED circuit and LED(s), which are sealed into a sealed-unit that meets the safety standard for V-0 grade under certain housing materials and thickness, so that other night light material can be used outside the sealed-unit, including any combination of paper, plastic, poly, chemical resins, pottery, porcelain, glass, mud, wood, bamboo, and/or metal for any other parts. Such an arrangement will still meet all safety standards because the other material(s) do not touch any hot wires.

The fifth feature of the current invention is that the timepiece movement has desired parts which may include LED(s), a light medium as part of the movement, an LED circuit, control means, and sensor means to enable the whole night light to have super slim dimensions. The size of the built-in light medium cover and movement of the lower housing can be variable depend on the different applications for final product size. For example, the light-medium top cover can be bigger or smaller or equal in size to the timepiece movement lower housing to let the final product look pretty.

The sixth feature of the current invention involves the night light device having multiple functions such as a night light function, color changing functions, multiple lit-areas, a plurality of receptacles, switch means, sensor means, as well as a time piece with either an analog display or LCD display, weather station display, project display, and/or liquid device for desired functions and light effects to meet market requirements.

The seventh feature of the current invention is that the movement can have its desired power source from a 10V to 250 Volt AC wall outlet having an appropriate frequency, or/battery power or solar power to supply the time piece operation. The power source for the movement and other functions can be same power source as the light or a different power source depend on market requirements.

The eighth feature of the current invention is that the light arrangement can be designed to have an analog arms cover. This will provide the whole dial face with very bright illumination to read the time message. This also is applicable to an LCD display unit by adding a back holder with light illumination.

BRIEF DESCRIPTION OF THE DRAWINGS

FIGS. 7A is a perspective view showing that the movement has a light-medium as part of the top cover with axis hole, and that the movement lower housing has diameter "d" and upper light-medium cover has diameter "1×d" with a desired LED input-end extending from an edge or desired location.

FIGS. 7B is a perspective view of a round movement having the light-medium as part of the top cover with axis hole, movement lower housing having a diameter "d" and the upper light-medium cover having a diameter "1/N×d" (N can be any number) with desired LED input-end(s) extended from an edge or desired location.

FIGS. 7C is a perspective view of a movement having the light-medium as part of the top cover with axis hole, the movement lower housing having a diameter "d" and the upper light-medium cover having a diameter "N×d" (N can be any number) with desired LED input-end(s) extended from an edge or desired location.

FIGS. 7D is a perspective view of a rectangular movement which has the light-medium as part of the top cover with axis hole, the movement lower housing having diameter "S×S'" and the upper light-medium cover having diameter "L×L'" with desired LED input-end(s) extended from an edge or desired location, the rectangular shape movement optionally having additional features such as a pendulum, alarm, bell, music, recorder, vibration, flash light or other features available from the market place.

FIG. 9 is a perspective view of a timepiece with LED light means according to a ninth preferred embodiment, the timepiece having a weather station display to show the time, date, temperature, moisture, and/or humidity by its built-in LCD dot-matrix display with LED light-medium to make it glow. The light medium can be an LCD glass or separate plastic piece as long as roughened, for example by a sand-blaster or conventional skills.

FIG. 10 is a perspective vie of a timepiece with LED light means according to a tenth preferred embodiment which has a light medium to provide the lower dial face with illumination and further has a projection means (illustrated as a liquid container with miniature stuff inside) to make the lower dial face project the image to the upper surface with time and a desired message to the viewer.

FIG. 11 is a perspective view of an analog timepiece with LED light means which has a lighting arrangement on the clock arms' protective cover for illumination with predetermined functions and for a predetermined period of time.

FIG. 12 shows details of the embodiment of FIG. 11 and in particular a preferred arrangement of LEDs on the front of the cover.

FIG. 13 includes perspective view of various arrangements of a sealed-unit with LEDs.

DETAILED DESCRIPTION OF THE PREFERRED EMBODIMENTS

Figure 1:
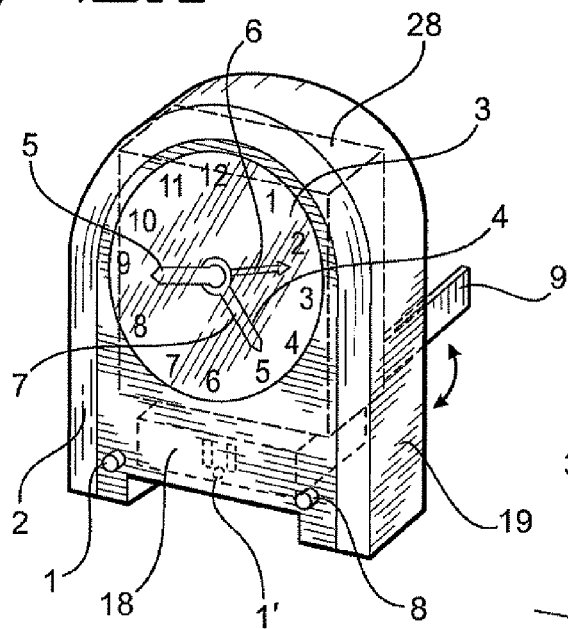
FIG. 1 is a perspective view of a timepiece with LED light means for a night light with motion sensor means, light sensor means, swivel prong means, and receptacle means according to a first preferred embodiment of the invention.

As shown in FIG. 1, a time piece (19) with LED light means has a movement (28) and sealed-unit (18) inside a housing (2). The sealed unit may have any combination selected from LED(s), an LED circuit, control means, sensor means, switch means, and prong means. Use of a sealed unit is good for safety reasons because prong means (9) and the LED circuit (not shown) and LED(s) have electric contact with live wires (high voltage) and therefore need to meet the UL safety standard which has very strict material requirements. It is very safe to put all these parts into the sealed unit that meets the flammability safety requirement. All the rest of the parts, such as movement, light-medium, front sheet (milky or frosted treated sheet), or other housing elements are not required to meet the safety standard if all parts in potential contact with live wires are sealed by a required material. This is one of the features of the current invention. It will help resolve product design and cost saving issues.

As also shown in FIG. 1, the arms (5) (6) (7) are securely installed on the movement (28) axis to provide an accurate time display to viewer. The prong means on the back of the housing (2) may use a fixed angle or swivel angle construction from conventional available skills. The housing (2) has a sensor means (1) and extra light means (8) on a desired location of the housing (2) to activate the LED(s) and provide extra illumination to the floor with stronger light beams.

Figure 2:
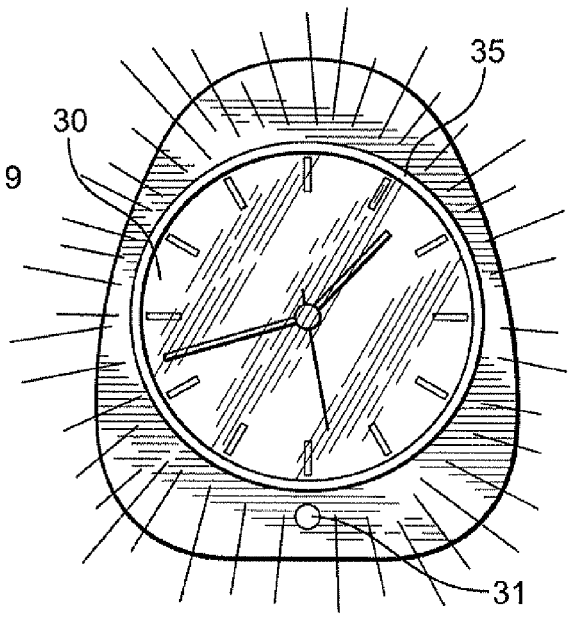
FIG. 2 is a front view of a piece with LED light means which has a second light source on a lower housing and in which the second light source may have a desired function such as changing color, fade-in and fade-out, steady on single color, time delay with sensor means, touch means for short time illumination, or any other light function available from conventional market skills.

FIG. 2 illustrates a second preferred embodiment having a dial face (35) with color changing effects. The time piece (30) has a second light means on a lower portion to provide a second lit-area of the time piece (30). The second lit area is disclosed in co-pending U.S. patent application Ser. No. 11/255,981.

Figure 3:
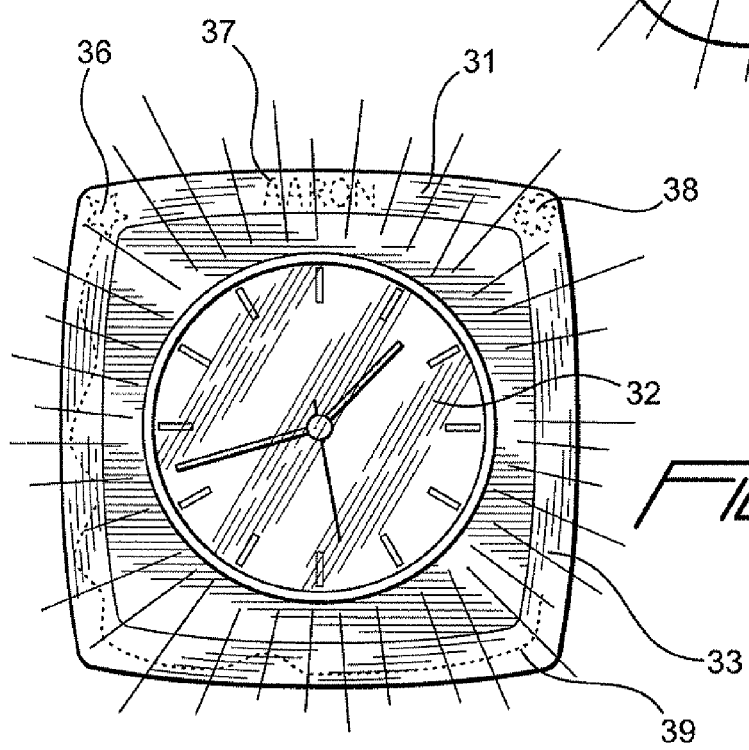
FIG. 3 is a front view of a timepiece with LED light means according to a third preferred embodiment in which the LED(s) incorporate Fiber Optics means to provide a plurality of lit areas on the timepiece housing and dial face for different light effect(s).

FIG. 3 illustrates a third preferred embodiment having a dial face (32) and housing (33) having multiple areas with the light effects including providing the dial face (32) with surface illumination and the housing (33) with a lot of fiber optics that appear as dots arranged to form an illuminated logo, name, or other shape or configuration. The timepiece may be a wall clock, alarm, or night light with analog movement, or another timepiece corresponding to including timepieces corresponding to conventional market available models and options but with added illumination.

Figure 4:
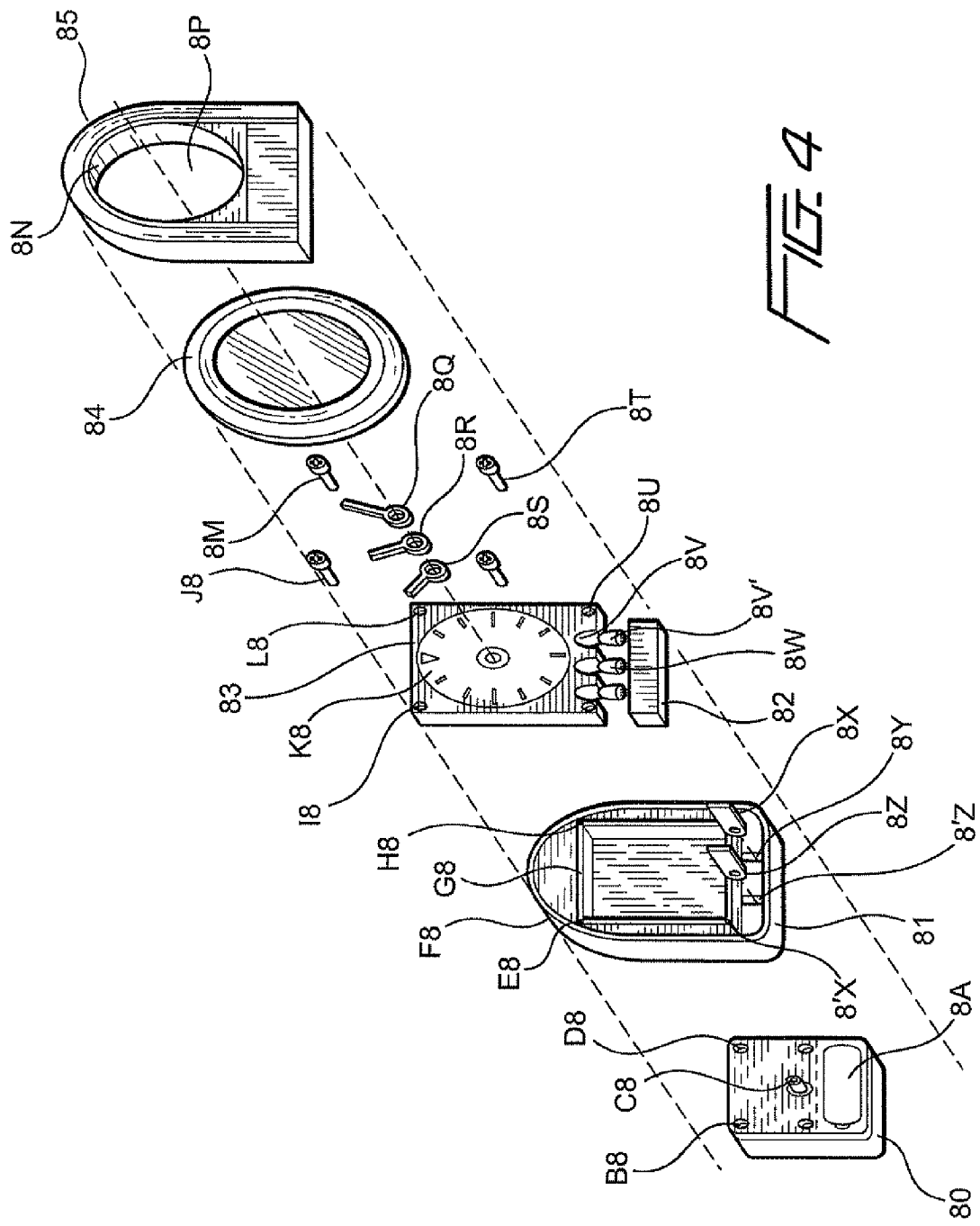
FIG. 4 is an exploded perspective view of the timepiece with LED light means of FIG. 1.

FIG. 4 shows details of the construction of a preferred timepiece with LED light means. The movement (80) has installation points (8A) (8B) (8C) (8D) to allow the movement (80) to be securely assembled to the lower housing (81). The prong means (8X) (8Z) are inserted into the housing slots (8Y) (8Z') to allow the night light to get electric power from the power source (illustrated as a 110 Volt AC, 60 hz power source from a home wall outlet of the type found in North American). The lower housing (81) has a movement compartment (8G) to allow movement (80) to fit in tight. The lower housing (81) also has a wall arrangement to enable the inner space to receive movement (80), light-medium (8K), LED sealed unit (82), prong means (8X) (8Z) at ideal locations. The light-medium (8K) has holes (81) (8L) (8U) and related screws (8J) (8M) (8T) to allow the light-medium to be fastened on the lower housing holes (8E) (8H) (8X'). The light-medium (8K) has a plurality of input-ends such as the right one (8V) which can allow the respective LED (8V') to be installed within the input-end (8V) to allow majority of the LED (8V') light beams get into and travel with the light-medium (8K) and allow a viewer to see the brightness of the whole surface of the light-medium unit. The light-medium (8K) is made of plastic material with a roughening treatment on its surface by sand-blasting or a tooling-texture process (or equivalent skill from conventional market available skills). The rough surface will prevent the majority light beams from passing through the edge and cause diffusion of the light beams traveling within the light-medium without large losses to the outside. Because the majority of light beams travel within the medium, a high degree of brightness is achieved. This effectively converts the LED point source to a smooth area illumination. This effect is enhanced by providing a milky or frosted front sheet to overlay on top of the light-medium in contrast to the above-cited U.S. Pat. No. 6,987,710 and U.S. Pat. No. 7,054,233 for wall and alarm clock applications, which at best might achieve the same effect if all five sides of the illumination module were to be sealed by mirror like reflector materials without any light beams been leakage from the five sides. Such an arrangement would require a lot of labor and is not as practical as the present invention with respect to mass production and meeting standard quality requirements. The current invention has of simplicity, uniformity, easy operation and low cost, and less labor intensive construction.

The arms (8S) (8R) (8Q) installed on the movement (80) axis (8C) as normal installation to show the time message to viewer. The arms protective cover (84) preferably is clear to allow viewers to see the arms' location to know the time. An upper housing (85) tightly covers the lower housing (81) to prevent other parts from loosening or falling apart during a drop test on the time piece.

Figure 5:
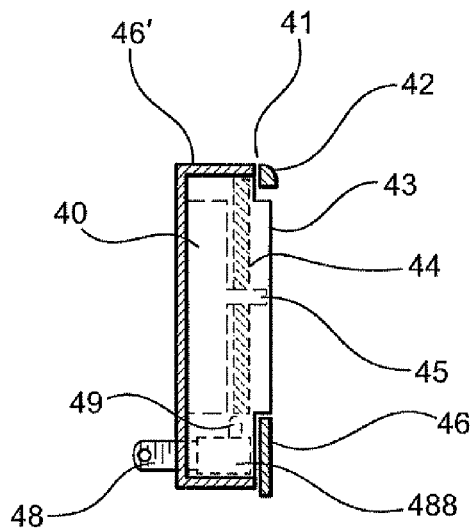
FIG. 5 cross-sectional side view of a timepiece with LED light means according to a fifth preferred embodiment, in which the timepiece movement's axis is lengthened to allow the light-medium thickness to fit between the arms level and movement.

FIG. 5 is a side view of a preferred embodiment. The timepiece has a movement (40) disposed within the back housing (46') with an axis (45) to install the arms (not shown). The movement (40) has one thick light-medium (44) which accommodates entire LED(s) (49) within the light-medium so all light beams will get into the light-medium (44) without leakage to outside. The light-medium (44) have a very rough surface by made by sand blasting or tooling, or an added milky compound or other conventional market available skills to make it very rough on its entire surface as discussed above. The light beams travel within the light-medium and quickly back and forth to cause the bright spot of the LED to change from a point light to a surface light. In front of the light-medium is a milky or frosted front sheet (not shown) which can make-up for any bright and dark areas to provide perfectly smooth illumination. By these two treatments, the dial face will have perfect brightness on every point of the entire dial face surface. A clear protective cover (43) for the arms of the clock is tightly fit within the front housing (42) (46) and assembled to the back housing (46') and fastened by tightening means selected from screws, solvent, sonic sealing, glue, rivet, or other equivalent skills from the art. The prong means (48) and LED (49) in the above-described sealed unit to enhance safety relative to other models in which all electric components are exposed to air and which therefore are more costly than the present invention with its sealed unit. In models without the sealed unit, all materials have to be V-0 Flammable grade to pass UL standard, have a very thick wall thickness, and use materials purchased from certain UL listed suppliers. The axis (45) on which is installed the second, minutes, hour, or time setting indicators needs to be long enough to allow the added light-medium thickness to properly fit on top of the movement cover and under the arms. A decorative dial face may be made using a stencil or milky/frosted front sheet with printing, logo, or marking on top of the light-medium unit. The movement has to be specially made to have a longer axis than other conventional time piece movements.

Figure 6:
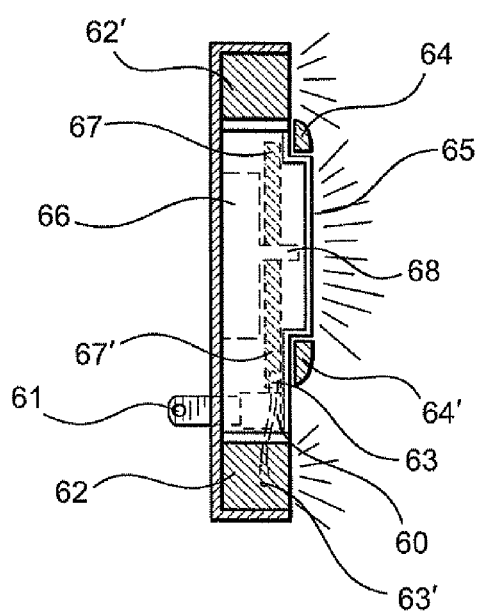
FIG. 6 is a cross-sectional side view of a timepiece with LED light means having an alternative construction according to a sixth preferred embodiment, including illumination at areas which have nothing to do with the timepiece for decoration purpose only.

FIG. 6 shows an alternative embodiment in which not only does the dial face (67) have illumination, but other exterior housing areas (62') (62) have illumination too. The rest of the parts are similar to those shown in FIG. 5. In FIG. 6, the extra LED(s) are extended from the sealed unit housing by conductive wires to spaces (62') and (62). These two spaces are filled with certain material such as opaque poly material so as to allow light to pass through and also have a certain percentage of light beams travel within the material to make a very good light effects. This embodiment includes a plurality of illuminated areas of the time piece, not only at the dial face and housing, but also other areas selected for decoration or value-appearance purposes. The axis (68) on which is installed the second, minutes, hour, or time setting still needs to be longer enough to allow the added light-medium thickness to properly fit top of the movement cover and under the arms. A decorative dial face may again be made using a stencil or milky/frosted front sheet with printing, logo, or marking of designs at an appropriate position on top of the light-medium unit. The movement has to be specially made to have a longer axis than other conventional time piece movements.

Figure 7:
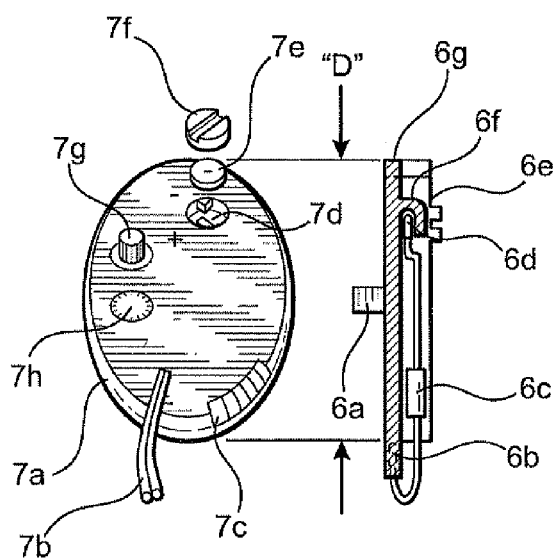
FIG. 7 illustrates a seventh preferred embodiment, including a timepiece with LED light means, in which the movement has a cover with light medium thickness and functions and built-in LED(s), LED circuit, control means, sensor means or other parts arranged to make the night light and timepiece super slim.

FIG. 7 shows a round movement (7a) which has its power source selected from a wall outlet power source such as a 110-250 Volt AC outlet with an appropriate frequency. Alternatively, the power can be come from a dry battery or batteries, or the power can be obtained from a solar panel or other energy saving device. The movement has at least one adjustment feature to allow people to set the time or alarm, or adjust music, volume, recording, or a snooze function by means of a switch, sensor or other component. The functions provided by the adjustment feature may include any functions available from conventional market available functions. The movement also has a lot of terminals to allow people to add multiple functions when the proper device is connected to the function terminal ends (7c).

FIG. 7 is a right hand side view showing an embodiment in which the light-medium (6g) is part of the movement. The cover of the movement (6e) has light-medium functions which allow the LED(s) to be installed on the input-end (6f) and cause the light to travel within the light-medium (6g) and provide a very even brightness on its entire surface. This will cause the entire time piece to have a more slim and compact size by reducing the movement cover thickness relative to other embodiments. Thickness is a very important consideration in meeting market requirements. The axis (6a) passes through the light-medium (6g) center hole to enable installation of the timepiece arms. The built-in sealed unit which has the LED(s), LED circuit or other required electric components, and power source to make the LED(s) turn on under predetermined timing for desired functions and periods of time. The LED(s) (6b) (6d) may be installed on the sealed unit housing or connected within the sealed unit housing by conductive wires and disposed within the light-medium walls.

FIG. 7A shows a round movement having a light-medium as part of the top cover with axis hole. The movement lower housing has diameter "d" and upper light-medium cover has diameter "1×d" with desired LED input-end(s) extended from an edge or desired location. FIG. 7B shows a round movement that has the light-medium as part of the top cover with axis hole. The movement lower housing has a diameter "d" and the upper light-medium cover has diameter "1/N×d" (N can be any number) with desired LED input-end(s) extended from an edge or desired location. FIG. 7C also shows a movement that has the light-medium as part of the top cover with axis hole. The movement lower housing has diameter "d" and upper light-medium cover has diameter "N×d" (N can be any number) with desired LED input-end(s) extended from edge or desired location. FIG. 7D shows a rectangular movement that has the light-medium as part of the top cover with axis hole. The movement lower housing has diameter "S×S'" and upper light-medium cover has diameter "L×L'" with desired LED input-end(s) extended from an edge or desired location. The rectangular shape movement may have additional features such as a pendulum, alarm, bell, music, recorder, vibration, flash light or other features available from the marketplace.

Figure 8:
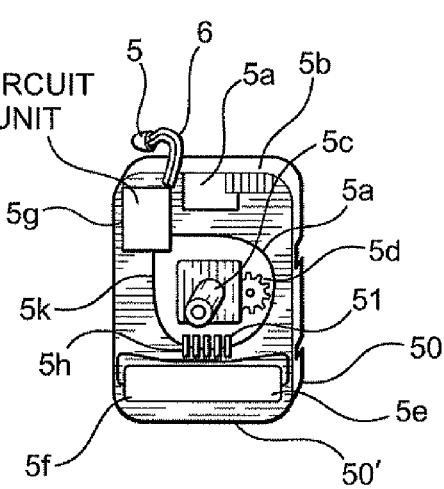
FIG. 8 is a perspective view of a timepiece with LED light means according to an eighth preferred embodiment, the timepiece movement having built-in LED(s), LED circuit, control means, sensor means, switch means and other optional parts, and a cover with light medium functions to make time piece as compact as desired.

FIG. 8 shows a preferred movement (50) which is the most low cost unit currently available. The lower housing (50') has movement components including an electric-coil (5*a*), output terminals (5*b*), axis (5*c*), gear sets (5*d*), battery "+" terminal (5*e*), battery "−" terminal (5*f*) and a quartz kit (not shown) to make the movement have good accuracy and allow timepiece arms (not shown) to show the time message and functions to consumers. The entire space of the most low cost unit has plenty of empty space as illustrated. The current invention uses the empty space to install the LED(s), LED circuit, and some necessary control means and parts (may including prong means) within the lower housing (50') and make a new top cover with axis hole and having light-medium properties. This will allow the whole movement to have built-in LED light functions.

If the built-in LED light device is powered by a movement battery (this case the movement and LED light device are powered by same battery power source), the LED light will only turn on after a sensor device has been triggered for short time, so that the LED is activated by the motion sensor to turn on for a limited time period.

If the built-in LED light device is connected with a wall outlet power source (for example a 110 Volt AC 60 Hz source) through prong means (i.e., the movement is powered by the battery and the LED device is powered by the wall outlet power source), then the LED light device can always be "On" because the power source is unlimited energy relative to the LED device, which uses only 0.3 to 1 Watt of power. Some designs may even have a very strange power source such as an LED light device and movement both connected with the wall outlet power, although such a design might be disadvantage because it will cause the movement to stop work while the prong or conductive means are separated from the wall outlet power source such that each time the termination happens, the consumer has to adjust the time again. For example, if the clock is installed in a bathroom, when one wants to use a hair dryer, the clock would need to be unplugged, after which the time would need to be adjusted again, each time the clock is unplugged from the wall outlet. To alleviate the unplugging problem, the multiple function time piece can have the receptacle (1) on front of the time piece as shown in FIG. 1. The receptacle is preferably grounded to safely accommodate all different electric devices such as a hair dryer, electric tooth brush, electric tooth water jet . . . which may have a grounded prong design.

FIG. 9 shows an embodiment with a liquid crystal display (hereafter as LCD) for displaying messages. The LCD (90') is made of glass which can be treated to provide a very rough surface according to the principles of the invention. This specially made glass with rough surface on the exterior of LCD (90') has a thickness that allows the LED(s) (92) (92') to be disposed within the glass thickness on the input-ends (99) (99'). The other parts include an LED sealed unit (91), prong means (97) of fixed type or swivel type, a back holder (94), a light-medium (95) (as an alternative to the rough surface on the LCD glass, the light-medium (95) can supply backlight to the LCD as discussed above). The LCD weather station message display may display messages including but not limited to temperature (98'), time (98"), date (98'") or any other information such as humidity (not shown), calendar (not shown), month (not shown), or other message available from conventional market. The built-in LCD dot-matrix display uses the LED light-medium (95) to make it glow. The light-medium (95) can be an LCD glass or separate plastic piece as long as it is adapted by means of a sand-blaster or other conventional skills to have a rough surface to obtain the desired light medium properties. The LCD display can be fully transparent or the semi-transparent type which does not affect the LED light-medium too much. In addition, a milky/frosted front sheet overlay (96) may be provided to overlay the light medium to get the best photometric effect and cause a very even brightness over the area of the light medium (95).

FIG. 10 timepiece with a projected image (2*a*) seen by a viewer. The image (2*a*) is projected from the lower dial face (2*g*) which has a timepiece movement (not shown) and LED sealed unit (2*e*) as in the normal timepiece arrangements described above, but with a thick liquid optics device (2*b*) to transfer the lower dial face's message to the viewer face (2*a*) with correct orientation for hour, minute, and second arms and marking. The thick liquid optic device (2*b*) may have a lot of miniatures with special treatment such as a magnetic base to make magnetic reaction with the second arm so a turtle (2*c*), by way of example, will stick with the second arm for each second to move. The turtle (2*c*) may have tiny wires to connect with duck 1 (2*c'*) and duck 2 (2*c"*) to provide a very valuable appearance to all viewers, and especially for kids. The swivel prong means (2*d*) are good because this timepiece can act as a desk top clock or night-light clock for two applications and thereby provide the consumer with a multiple purpose timepiece.

FIG. 11 shows an analog time piece (110) having at least 3 arms (11*g*) (11*h*) (11I) to show the time message of hour, minute, second to a viewer though the protective cover (11*a*). The protective cover (11*a*) made of clear plastic, which may have texture or a milky/frosted surface on the area which is not in front of the dial face (11*d*). The texture or milky/frosted surface treatment will let the cover (11*a*) have light-medium properties so as to allow the light beams to travel within the cover and a majority of light beams to be seen on the cover surface. This kind of light beam arrangement is sufficient to offer good illumination to the dial face (11*d*). At least one LED (11*k*) (11*k'*) (11*k"*) is disposed within the cover (11*a*) on its grooves, openings, windows, cut-outs to allow the LED light beams to travel within the cover material. This arrangement can be used to cause a brighter ring (11M) (11M') to be seen and make the dial face (11*d*) have very good brightness to enable the time message to be easily seen. The cover (11*d*) has several latch means (11*e*) (11*e'*) to allow the cover (11*d*) to tightly joined together with lower movement housing (11*c*). The movement has a lot of grooves and/or holes to allow assembly with the cover (11*d*) or with the other housing parts (not shown). The LED light means has conductive means to connect with the LED circuit, and control means and prong means to make the illumination.

FIG. 12 a cover 120 with grooves (122) (122') (122") to provide space to accommodate LEDs (121) (121') (121") and enable the light-medium's cover (120) to have good brightness to cause the inner dial face to be readable while needed.

As shown in FIG. 13, the sealed-unit (S2) (S12) (S22) has pre-designed openings (S2') (S12') (S22') to provide a universal type of the sealed-unit (S2) (S12) (S22) that can fit into the opening (S2') (S12') (S22'), which can use the conventional market method to fasten with the base (S1) (S10) (S20), and which may assembled with the night light by a screw (S23) (S24), welding, sonic sealing, glue, solvent, a rivet, a latch, or equivalent fixing-means known to those skilled in the art to allow the sealed-unit be fixed position. The sealed-unit (S2) (S12) (S22) preferably uses a plastic with certain thickness to pass the 94-V-0 flammable grade to meet the safety standard while all other housing parts (S1) (S10) (S20) are without any limitation as to materials because they cannot touch live wires. The base (S1) (S10) (S20) can be any shape, configuration, design, curvature, thickness, material, and/or dimension, with built-in or separated receptacle means. The sealed-unit has LED related circuit, control means, and prong means disposed within, and can be designed for a super slim and wider unit or a thicker but smaller unit, depending on the market requirement. For convenience, the unit can also be designed to fit into different base shapes such as a boat shape (S1), tube shape (S10), or rectangular shape (S20) for different night light applications.

The boat base (S1) has an opening (S2') to allow the sealed-unit (S2) to fit into the space. The sealed-unit (S2) has an LED related circuit (S8) and its components (S9) and prong means (S7) (S7') are sealed within the case (S2). The top of the case has two LEDs (S3) (S4) which are connected with the inner circuit (S8) so that all of the LEDs' electric legs can be touched by test equipment to make sure a kid's finger will not touch these live wires and cause dangerous condition. The LED (S5) can use the conductive wires (S6) to extend away from the unit's housing (S2) for other illumination arrangements.

The LEDs (S3) (S4) also fit into the base opening (S3') (S4') and a wall (S2") will cover the LEDs after assembly with the base housing. After assembly, the LED light beams can pass through the base's opening area (S) to provide good light effects to the upper display unit.

The tube base (S10) has an opening (S12') to allow the sealed-unit (S12) to fit two or more LEDs at a desired position and orientation, and a wiring arrangement that can allow the light beams to be emitted out from the base top opening (S18) and lower window (S18') for desired illumination.

The rectangular base (S20) offers a special surface light arrangement. The LED spot light beams through a light-medium (S28) to allow the LED light beam to travel within the light-medium (S28) and a majority of light beams to be seen by a viewer from the light-medium (S28) surface. The viewer will not see any hot spot of LED light brightness but will instead see a very soft and even area light for special illumination. The rectangular base (S20) has an opening (S22') to allow the sealed-unit (S22) to fit tightly therein and be secured with glue, solvent, or other adhesive means, sonic means, welding means, latch means, or hook means. The LED will fit into the light-medium's thickness to get the best result.

It will be appreciated that the invention is not to be limited by the above description, embodiments, and so forth, and that any equivalent function, replacement, alternative process, treatments, experiments, and other arrangements may still belong within the scope of the current invention.

The invention claimed is:

1. A digital time piece with LED light means, comprising:
at least one LCD display and LCD control circuitry for controlling the LCD display to display information including a time while connected to a power source, the LCD display including a light medium for illuminating the LCD display, the light medium including a surface having a rough finish;
at least one LED for supplying light to the light medium, said LED driven by an LED power circuit and control means to cause the LED to exhibit desired lighting functions; and
a milky/frosted front sheet overlay to said light-medium to enhance said area lighting effect by providing an even more uniform brightness over said surface;
a housing for installing all above-listed parts,
wherein the surface having a rough finish causes light beams from the at least one LED to travel within the light medium before exiting the light medium to provide diffusion effects that cause the light medium to exhibit an area lighting effect with uniform brightness over said surface wherein the light medium is in the form of a glass layer of the LCD or a separate plastic piece, and
wherein the LCD display is fully transparent or semi-transparent without affecting the light medium.

2. The digital time piece of claim 1, further comprising at least one prong means to supply power to the LED and LCD.

* * * * *